United States Patent [19]

Koizumi et al.

[11] Patent Number: 4,692,924
[45] Date of Patent: Sep. 8, 1987

[54] LASER TREATMENT APPARATUS

[75] Inventors: Hiroshi Koizumi, Saitama; Masatsugu Kijima; Sinya Tanaka, both of Tokyo, all of Japan

[73] Assignee: Tokyo Kagaku Kakai Kabushiki Kaisha, Tokyo, Japan

[21] Appl. No.: 783,967

[22] Filed: Oct. 4, 1985

[30] Foreign Application Priority Data

Oct. 6, 1984 [JP] Japan .......................... 59-150720[U]

[51] Int. Cl.$^4$ .............................................. H01S 3/13
[52] U.S. Cl. ......................................... 372/30; 372/38
[58] Field of Search .............................. 372/25, 30, 38

[56] References Cited

U.S. PATENT DOCUMENTS 4,166,985 9/1979 White ..................................... 372/30

Primary Examiner—Gene Wan
Attorney, Agent, or Firm—Finnegan, Henderson Farabow, Garrett Dunner

[57] ABSTRACT

A laser treatment apparatus for determining that the output power of a treatment laser beam is proper in accordance with the selected output power. The treatment apparatus comprises a laser source for generating a treatment laser pulse beam, a laser optical path for guiding the treatment laser pulse beam toward an object to be treated, a power setting means for controlling the laser source to set the power output of the treatment laser pulse beam, and a radiation switch for selectively switching the laser source on and off. A safety device is provided to cause the laser source to output a checking laser pulse beam prior to actual transmission of the treatment laser pulse beam and at a time after the activation of the radiation switch. The checking laser pulse beam has a power corresponding to the actual power of the treatment laser pulse beam to be outputted by the laser source. A power detector detects the power output of the checking laser pulse beam and a comparator determines whether the power output of the checking laser pulse beam is correct in view of the power of the treatment laser pulse beam set by the power setting means.

16 Claims, 3 Drawing Figures

LASER TREATMENT APPARATUS

BACKGROUND OF THE INVENTION

1. Field of the Invention

The present invention relates to a laser treatment apparatus.

2. Description of the Related Art

A conventional laser treatment apparatus generally includes power setting means and a radiation switch. In this known art, an object to be treated, e.g. a human, is radiated for its treatment with a treatment laser pulse beam which is generated by turning the radiation switch on. In this case, if such a treatment laser beam should have a power output higher than a preset value, the object to be treated would be damaged. Accordingly, in the conventional apparatus, a check of the radiation output is carried out with a shutter of a laser optical system shut in order to confirm whether or not the power output of the treatment laser beam is in accord with the preset power value every time before the treatment laser beam is generated.

However, in the conventional laser treatment apparatus, the confirmation of a correct power output value of the treatment laser beam requires a checking radiation switch to be manually turned on to generate a checking laser pulse beam before the radiation switch is turned on. Accordingly, it requires much time and labor for such confirmation, which often results in an obstacle for carrying out a prompt treatment after confirming whether or not there exists something abnormal in the power output.

The present invention is accomplished in order to eliminate the above-mentioned inconvenience inherent in the conventional laser treatment apparatus.

SUMMARY OF THE INVENTION

It is therefore a primary object of the present invention to provide a laser treatment apparatus in which a confirmation of whether or not there exists something abnormal in the output value of a treament laser beam is promptly made available, so that undivided attention can be concentrated on a treatment.

The features of the present invention reside in the point that a laser treatment apparatus according to the invention includes a safety device for outputting a laser pulse beam for checking whether a treatment laser pulse beam is in accord with a preset power output before the treatment laser pulse beam is generated by turning a radiation switch on, and stopping the radiation of the treatment laser pulse beam or indicating an existence of an abnormality when the output of the checking laser pulse beam is found to be abnormal compared with the preset power output.

The function of a laser treatment apparatus according to the present invention is such that a checking laser pulse beam is automatically outputted by a safety device before a treatment laser pulse beam is outputted in treatment.

BRIEF DESCRIPTION OF THE DRAWINGS

The above and other objects, novel features and advantages of the present invention will become more apparent from the description on exemplary embodiment of the invention when read in conjunction with the accompanying drawings in which.

DETAILED DESCRIPTION OF THE EMBODIMENTS

Preferred embodiments of the present invention will be described hereunder with reference to the accompanying drawings.

Figure 1:
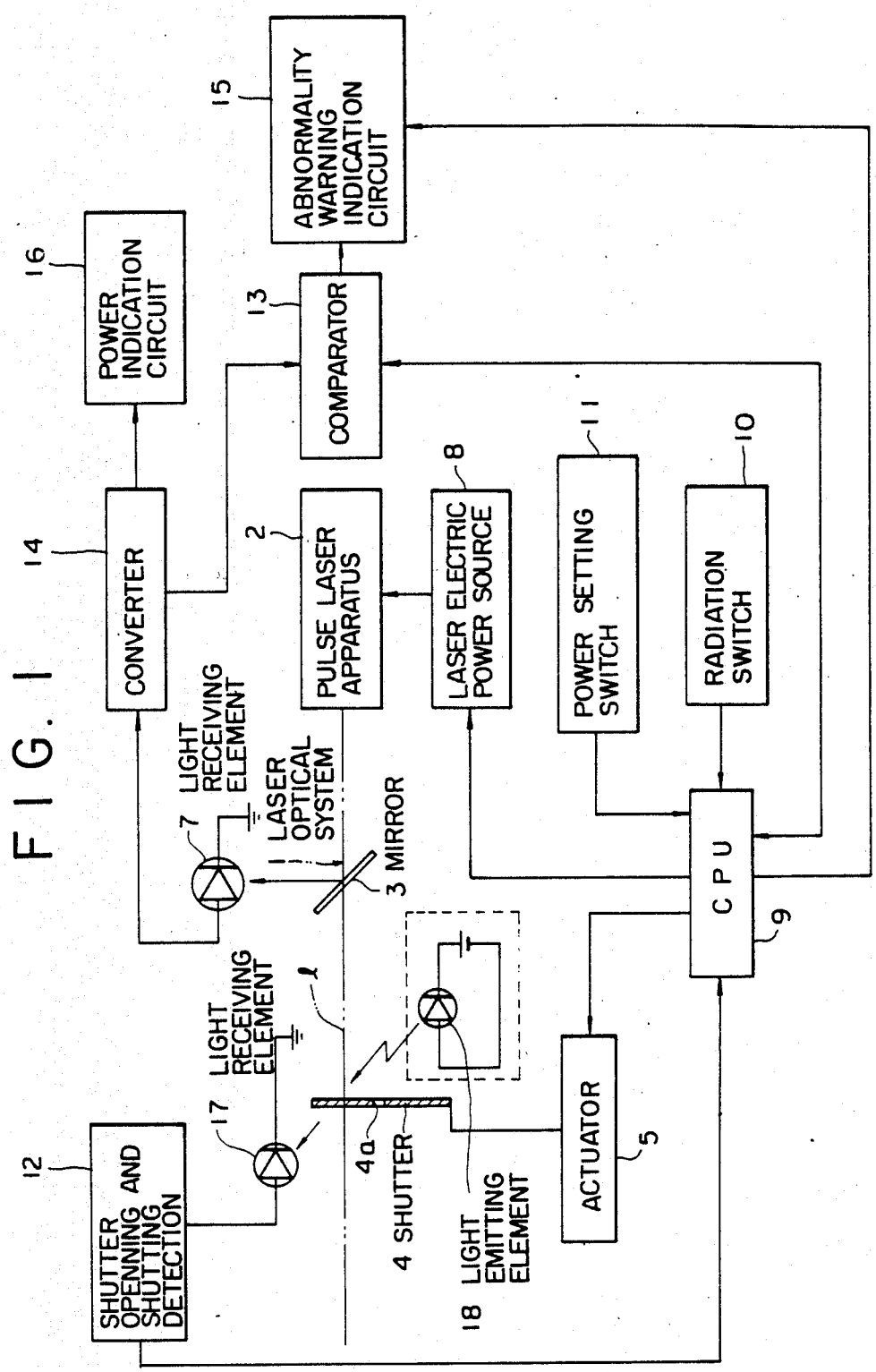
FIG. 1 is a block diagram showing a laser treatment apparatus according to a first embodiment of the present invention.
Figure 2:
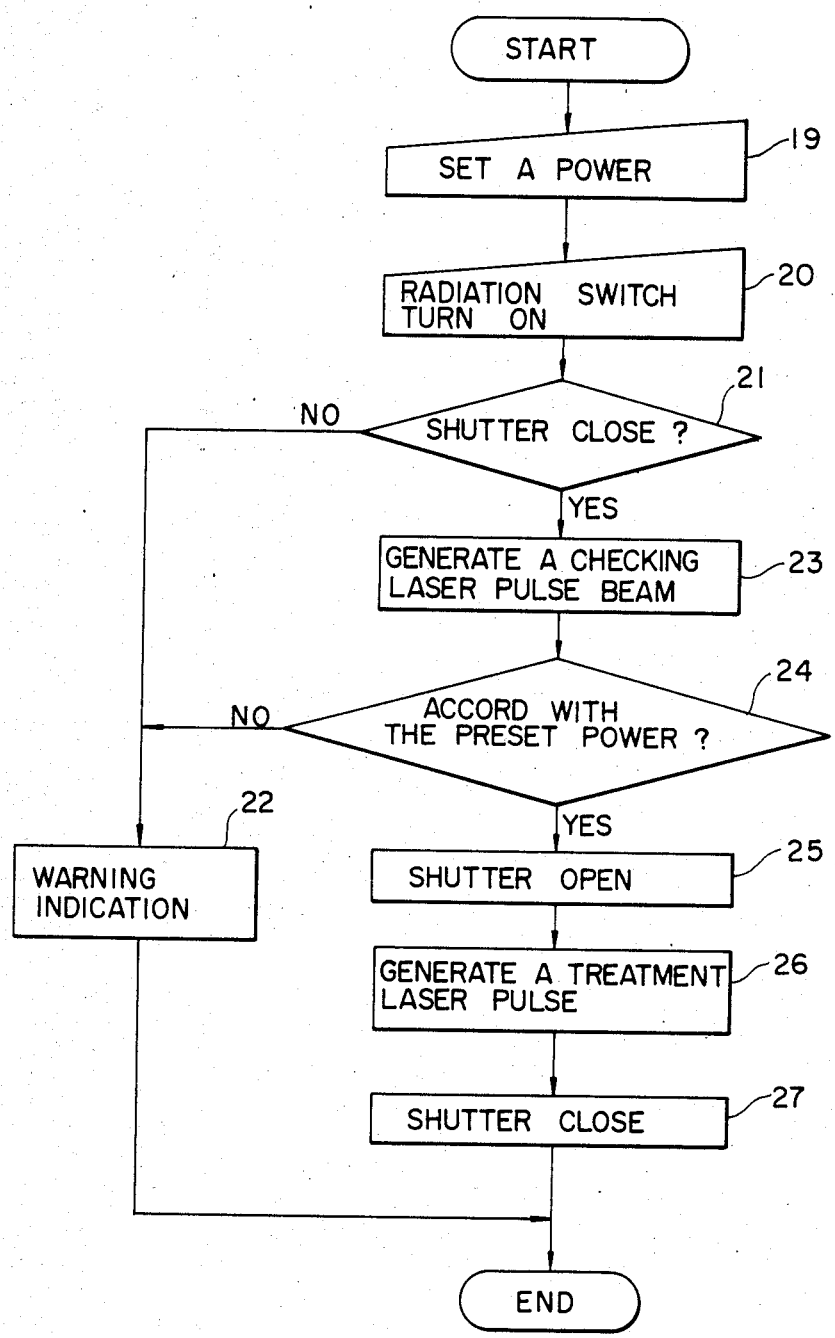
FIG. 2 is a flow chart of the laser treatment apparatus of FIG. 1.

FIGS. 1 and 2 illustrate a laser treatment apparatus according to a first embodiment of the present invention. In FIG. 1, reference numeral 1 denotes a laser optical system, reference numeral 2 denotes a pulse laser apparatus, and l denotes a laser optical axis. The laser optical system 1 is provided with a semitransparent mirror 3 and a shutter 4. The shutter 4 is actuated by a shutter actuator 5. The shutter 4 has the function for shielding a laser pulse beam. The semitransparent mirror 3 has a 99% transmission and the remaining 1% of the laser beam is reflected thereon and guided to a light receiving element 7.

The pulse laser apparatus 2 is driven by a laser electric power source 8. The on and off operation of the electric power source 8 is controlled by CPU 9 serving as a control center of the laser treatment apparatus. The CPU 9 also serves as a primary portion of the safety device. The CPU 9 is inputted with a radiation order information from a radiation switch 10, a power setting information from a power setting switch 11 serving as power setting means, a shutter opening and shutting information from a shutter opening and shutting detection circuit 12, and an output information from a comparator 13. The radiation switch 10 outputs 2 pieces of equalizing pulses as the radiation order information in succession. A first equalizing pulse is adapted to use for outputting a checking laser pulse beam. On the other hand, a second equalizing pulse is adapted to use for outputting a treatment laser pulse beam. The comparator 13 is adapted to detect whether or not there is something abnormal in the output of the treatment laser pulse beam. The comparator 13 constitutes an abnormality detecting circuit together with the light receiving element 7, and a converter 14. When the power setting switch 11 is manipulated, standard level information corresponding to a power set through the CPU 9 is inputted in the comparator 13. The comparator 13 compares the standard level information with detecting information outputted from the converter 14, and if something abnormal is found, outputs abnormality warning information toward the CPU 9. The comparator 13 also has the function for outputting information to an abnormality warning indication circuit 15.

The converter 14 has the function for converting the output of the light receiving element 7 to the output of the laser pulse beam based on the output of the light receiving element 7. The output of the converter 14 is supplied to the comparator 13 as well as a power indication circuit 16. The power indication circuit 16 indicates the radiated power of the laser pulse beam.

The shutter opening and shutting detection circuit 12 is inputted with the output of the light receiving element 17. The light receiving element 17 is adapted to receive radiation light emitted from a light emitting element 18. The radiation light emitted from the light emitting element 18 is shielded when the shutter 4 is shut. When the shutter 4 is open, the radiation light reaches the light receiving element 17 through an opening 4a. If the radiation switch 10 is turned on when the shutter 4 is shut, the CPU 9 issues an order to turn the laser electric power source 11 on for radiating one shot of a checking laser pulse beam. The details of the controlling thereof will be described next with reference to a flow chart of FIG. 2.

At a time when treatment is started, the power switch 11 is manipulated to set the power of the treatment laser pulse beam (step 19). Next, the radiation switch 10 is turned on (step 20). When the radiation switch 10 is turned on, a radiation switch-on radiation order information is inputtted by the CPU 9. Then, the CPU 9 carries out a process for checking whether or not the shutter 4 is closed (step 21). Before the treatment is started, the shutter 4 is normally shut. However, if the shutter 4 is not shut, abnormality warning information is inputted to the abnormality warning indication circuit 15 through the CPU 9 (step 22). When the shutter 4 is shut, the CPU 9 outputs order information for generating a checking laser pulse beam toward the laser electric power source 8 (step 23). By this, the checking laser pulse beam is radiated from the laser apparatus 2. A part of the checking laser pulse beam is reflected on the semitransparent mirror 3, guided to the light receiving element 7, and its photoelectric transfer output is guided to the converter 14. The output of the converter 14 is inputted in the comparator 13, and the comparator 13 checks whether or not the power of the checking laser pulse beam is in accord with the preset power (step 24). When the power of the checking laser pulse beam is not in accord with the preset power, the comparator 13 outputs abnormality warning information, and the abnormality warning indication circuit 15 indicates the improper power level (step 22). At the same time, the abnormality warning information is inputted in the CPU 9 to stop the generation of the treatment laser pulse beam. When the abnormality warning information is not inputted from the comparator 13, the CPU 9 outputs a driving order signal toward the shutter actuating circuit 5. When the shutter 4 is opened (step 25) due to the foregoing, a shutter open signal is inputted by the CPU 9 from the shutter opening and shutting detection circuit 12. Based on this shutter open information, the CPU 9 outputs an order signal for generating a treatment laser pulse beam toward the laser electric power source 8 (step 26). After the treatment laser pulse beam is generted, the CPU 9 outputs a shutter actuating signal to the shutter driving circuit 5. As a result, the shutter 4 is shut (step 27), and generation of the treatment laser pulse beam is completed.

Figure 3:
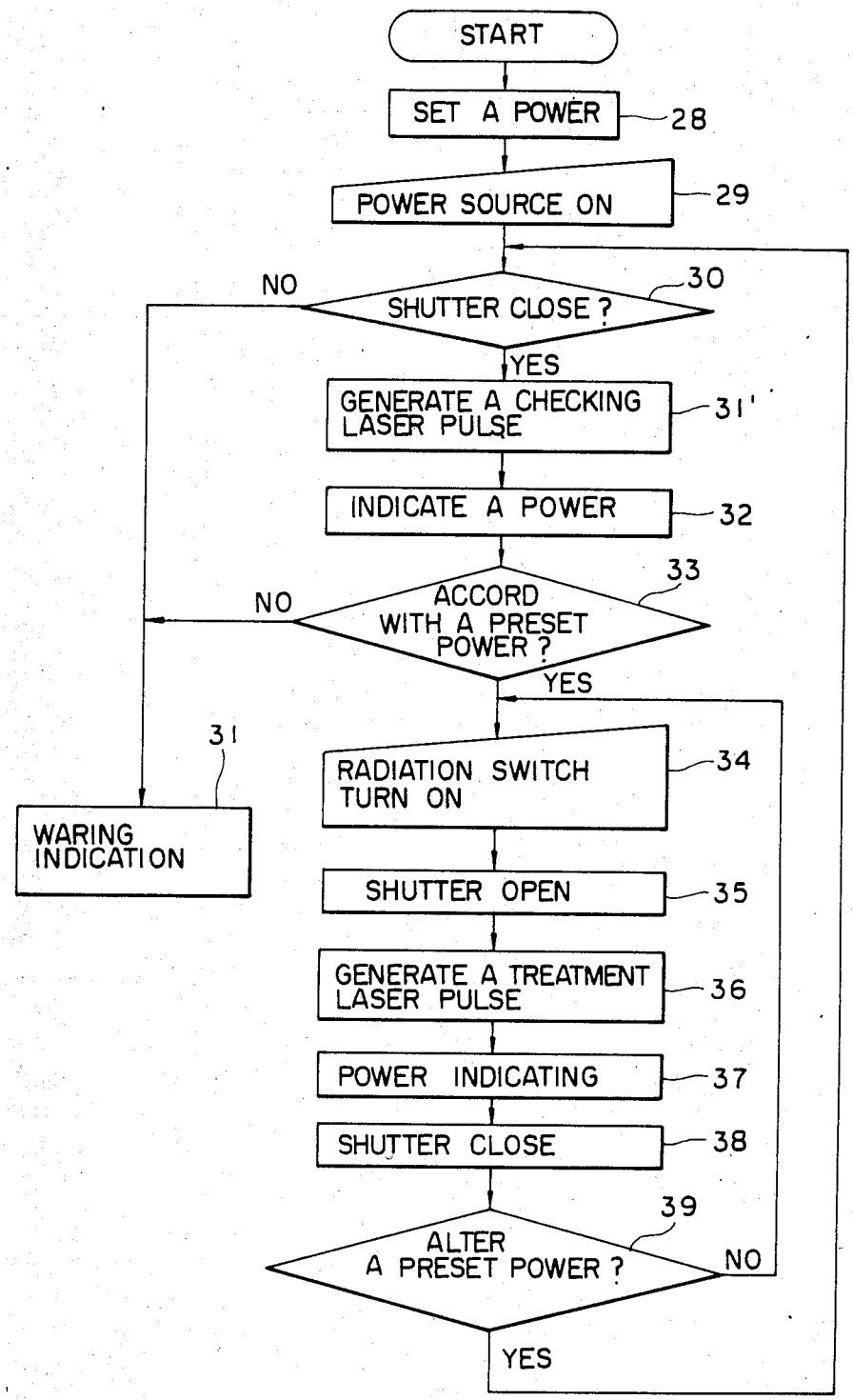
FIG. 3 is likewise a flow chart showing a laser treatment apparatus according to a second embodiment of the present invention.

FIG. 3 illustrates the operation sequence of a laser treatment apparatus according to a second embodiment of the present invention. The power of the laser pulse beam is preset in the step 28. When the switch of the electric power source is turned on in the step 29, there starts the checking whether the shutter 4 is shut or not in the step 30. When the shutter is found to be open, the abnormality is indicated in the abnormality indication warning indication circuit 15 (step 31). When the shutter 4 is found to be closed, the checking laser pulse beam is generated in the step 31'. The power of the checking laser pulse beam is indicated in the power indication circuit 16 (step 32). Next, a checking is carried out whether or not the power of the checking laser pulse beam is in accord with the preset power (step 33). When it is found to be "not in accord", in other words, when an abnormality is found, the abnormality warning indication is indicated in the step 31. When no abnormality is found, a shutter actuation order is outputted from the CPU 9 upon turning-on of the switch 10 of the radiation switch 10 in the step 34. As a result, the shutter 4 is opened (step 35). Thereafter, order information for generating the treatment laser pulse beam is outputted toward the laser electric power source 8 from the CPU 9. By this, a treatment laser pulse beam is generated (step 36). A part of the treatment laser pulse beam is reflected on the semitransparent mirror 3, received by the light receiving element 7, and the photoelectric transfer signal is inputted in the converter 14, and the power of the treatment laser pulse beam is indicated in the indication circuit 16 (step 37). Thereafter, the CPU 9 outputs the shutter closing order information toward the shutter actuation circuit 5. As a result, the shutter 4 is closed (step 38).

Thereafter, it is determined whether or not the preset power is altered in the step 39. When the power of the treatment laser pulse beam is altered by manipulating the power setting switch 11 after the radiation switch 10 is turned on, the processes in the steps 31 and 33 are carried out in order to confirm whether an abnormality exists in the treatment laser pulse beam. In the case the radiation switch 10 is turned on without manipulating the power setting switch 11, only the treatment laser pulse beam is outputted everytime the radiation switch 10 is turned on assuming that there exists no abnormality in the preset power.

Although in this second embodiment, the checking laser pulse beam is preliminarily outputted before the radiation switch 10 is turned on, the checking laser pulse beam may be outputted after the radiation switch is turned on.

As described in the foregoing, a laser treatment apparatus according to the invention includes a safety device for outputting a laser pulse beam for checking whether a treatment laser pulse beam is in accord with a preset power output before the treatment laser pulse beam is generated by turning a radiation switch on, and stopping the radiation of the treatment laser pulse beam or indicating an existence of an abnormality when the output of the checking laser pulse beam is found to be something abnormal compared with the preset power output. Accordingly, a confirmation of whether or not there exists an abnormality in the output value of a treatment laser beam is promptly made available, so that undivided attention can be concentrated on a treatment.

Although the present invention has been described in connection with preferred embodiments thereof, it will be appreciated that many modifications and variations will readily occur to those skilled in the art without departing from the spirit and scope of the invention.

What is claimed is:
1. A laser treatment apparatus comprising:
   a laser source for generating a treatment pulse beam;
   a laser optical path for guiding said treatment laser pulse beam toward an object to be treated thereby;
   a power setting means for controlling said laser source to set the power output of said treatment laser pulse beam;
   a radiation switch for selectively switching said laser source to output said treatment laser pulse beam or to stop the output of said treatment laser pulse beam;

a safety device for enabling said laser source to output a checking laser pulse beam prior to the transmission of said treatment laser pulse beam through said laser optical path and after the activation of said radiation switch to select the output of said treatment laser pulse beam, said checking laser pulse beam having a power corresponding to the actual power of said treatment laser pulse beam outputted by said laser source;

a power detector for detecting the power output of said checking laser pulse beam outputted from said laser source; and a comparator for comparing said detected power output of said checking laser pulse beam with a predetermined power level corresponding to the power of a treatment laser pulse beam as set by said power setting means, said safety device for preventing the transmission of said treatment laser beam from said laser source if said comparator determrines that said power of said checking laser pulse does not correspond to said predetermined power level corresponding to a treatment laser pulse beam as set by said power setting means.

2. A laser treatment apparatus according to claim 1, further comprising an abnormality warning indicator for indicating an abnormality when said power output of said checking laser pulse beam does not correspond to said predetermined power level of a treatment laser pulse beam as set by said power setting means.

3. A laser treatment apparatus according to claim 1, wherein said apparatus further comprises a shutter disposed in said optical laser path for preventing said checking laser pulse beam and said treatment laser pulse beam from being transmitted to said object to be treated, said safety device including means for closing said shutter when said checking laser pulse beam is outputted from said laser source and for opening said shutter when said comparator determines that said power output of said checking laser pulse beam corresponds to said predetermined power level corresponding to a treatment laser pulse beam as set by a power setting means.

4. A laser treatment apparatus according to claim 3, wherein said apparatus further comprises a shutter opening and shutting detection means for detecting whether said shutter is open or shut, said safety device further including means for preventing said laser source from outputting said checking laser pulse beam and said treatment laser pulse beam responsive to said shutter opening and shutter detection means detecting that said shutter is in said open state prior to said checking laser pulse beam being outputted.

5. A laser treatment apparatus according to claim 1, wherein said power detector includes means for photoelectrically detecting the power level of said checking laser pulse beam.

6. A laser treatment apparatus according to claim 1, wherein said safety device includes means for enabling the transmission of said treatment laser pulse beam along said laser optical path only in response to the activation of said radiation switch after said comparator determines that the power output of said checking laser pulse beams corresponds to said predetermined power level of a treatment laser pulse beam as set by said power setting means.

7. A laser treatment apparatus according to claim 6, wherein said safety device includes means for enabling said laser source to output a different laser pulse beam in response to the activation of said radiation switch after the selection of a different power output for said laser pulse beam by said power setting means, said different checking laser pulse beam having a power level corresponding to the actual power level of said different treatment laser pulse beam.

8. A laser treatment apparatus comprising:
a laser source for generating a treatment laser pulse beam;

a laser optical path for guiding said treatment laser pulse beam to an object to be treated thereby;

a power setting means for setting the power of said treatment laser pulse beam generated by said laser source;

a radiation switch for selectively switching said laser source to output said treatment pulse beam or to inhibit the output of said treatment laser pulse beam, said laser power source for outputting a checking laser pulse beam having a power corresponding to the actual power of said treatment laser pulse beam;

a power detector for detecting said power of said checking laser pulse beam; and a power indicator for indicating said power of said checking laser pulse beam as detected by said power detector.

9. A laser treatment apparatus according to claim 8, wherein said apparatus further comprises:
a comparator for comparing said power of said checking laser pulse beam with a predetermined power level of a treatment laser pulse beam having a power corresponding to said power output set by said power setting means; and a safety device for inhibiting the transmission of said treatment laser pulse beam along said laser optical path responsive to said comparator detecting that said power of said checking laser pulse beam does not correspond with the power of a treatment laser pulse beam corresponding to the power output set by said power setting means.

10. A laser treatment apparatus according to claim 9, further comprising an abnormality warning means for indicating an abnormality responsive to said comparator detecting that said power output of said checking laser pulse beam does not correspond with a power of a treatment laser pulse beam having said power output set by said power setting means.

11. A laser treatment apparatus according to claim 9, further comprising a shutter disposed in said laser optical path for preventing said checking laser pulse beam and said treatment laser pulse beam from being transmitted along said laser optical path, said safety device including means for shutting said shutter responsive to said checking laser beam being outputted from said laser power source and for opening said in response to said comparator detecting that the power of said checking laser pulse beam corresponds to the power of a treatment laser pulse beam having said power output set by said power setting means.

12. A laser treatment apparatus according to claim 11, further comprising a shutter opening and shutting detection means for detecting whether said shutter is open or closed, said safety device including means for preventing said laser source from outputting said checking laser pulse beam and said treatment laser pulse beam responsive to said shutter opening and shutting detection means detecting that said shutter is open at a time preceding the output of said checking laser pulse beam by said laser power source.

13. A laser treatment apparatus according to claim 8, wherein said power detector includes means for photoelectrically detecting the power of said checking laser pulse beams.

14. A laser treatment apparatus according to claim 8, wherein said power detector includes means for detecting the power of said treatment laser pulse beam and said power indicator includes means for indicating said detected power of said treatment laser pulse beam.

15. A laser treatment apparatus according to claim 9, wherein said safety device includes means for enabling said laser source to generate said treatment laser pulse beam in response to the activation of said radiation switch only after said comparator detects that the power of said checking laser pulse beam corresponds to a treatment laser pulse beam having said power output set by said power setting means.

16. A laser treatment apparatus according to claim 8, wherein in response to said power setting means setting said power output of said treatment laser pulse beam to a different level, said laser source generates a different checking laser pulse beam having a power level corresponding to said different power output and wherein said power detector detects said power of said different checking laser pulse beam and said power indicator indicates said detected power of said different checking laser beam.

* * * * *

UNITED STATES PATENT AND TRADEMARK OFFICE
CERTIFICATE OF CORRECTION

PATENT NO. : 4,692,924

DATED : September 8, 1987

INVENTOR(S) : Hiroshi Koizumi et al.

It is certified that error appears in the above-identified patent and that said Letters Patent is hereby corrected as shown below:

Claim 13, Column 7, line 6, change "beams" to -- beam --.

Signed and Sealed this

Ninth Day of February, 1988

*Attest:*

DONALD J. QUIGG

*Attesting Officer*  *Commissioner of Patents and Trademarks*